(12) United States Patent
McNeal et al.

(10) Patent No.: US 7,232,215 B2
(45) Date of Patent: Jun. 19, 2007

(54) REINFORCED NOSE BRIDGE AND EYEGLASSES UTILIZING SAME

(75) Inventors: Joseph R. McNeal, Hailey, ID (US); George T. Giroux, Ketchum, ID (US)

(73) Assignee: Smith Sport Optics, Inc., Ketchum, ID (US)

( * ) Notice: Subject to any disclaimer, the term of this patent is extended or adjusted under 35 U.S.C. 154(b) by 0 days.

(21) Appl. No.: 11/122,252

(22) Filed: May 3, 2005

(65) Prior Publication Data
US 2006/0250572 A1 Nov. 9, 2006

(51) Int. Cl.
G02C 5/02 (2006.01)

(52) U.S. Cl. .................... 351/129; 351/110; 351/124; 351/131

(58) Field of Classification Search ........ 351/124–139, 351/67–82, 103–110, 178
See application file for complete search history.

(56) References Cited

U.S. PATENT DOCUMENTS 2,243,770 A * 5/1941 Nerney .................. 351/129
4,690,523 A * 9/1987 Loiacono .................. 351/129
6,186,623 B1 * 2/2001 Giacomuzzo .............. 351/106

OTHER PUBLICATIONS

Four photographs (four sheets) showing nose bridge of prior art eyeglasses, taken prior to May 2005.

* cited by examiner

Primary Examiner—Huy Mai
(74) Attorney, Agent, or Firm—Dorsey & Whitney LLP

(57) ABSTRACT

The invention is directed to a reinforced nose bridge structure, eyeglasses employing the reinforced nose bridge structure, and methods of making reinforced nose bridge structures and eyeglasses. A reinforced nose bridge structure includes an elongated body and a wire extending along the body for most of its length. The ends of the wire project from the body to form a pair of spaced-apart nose pad supports. Respective nose pads are mounted at the ends of the wire forming the nose pad supports. The nose bridge may be attached directly to eyeglass lenses or to complete or partial frames for the lenses.

32 Claims, 5 Drawing Sheets

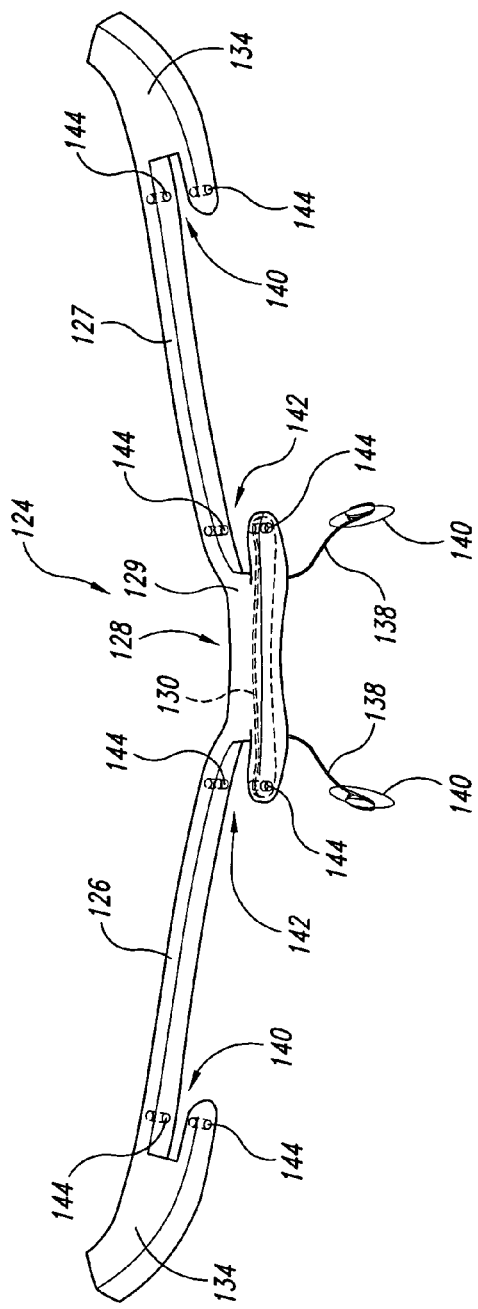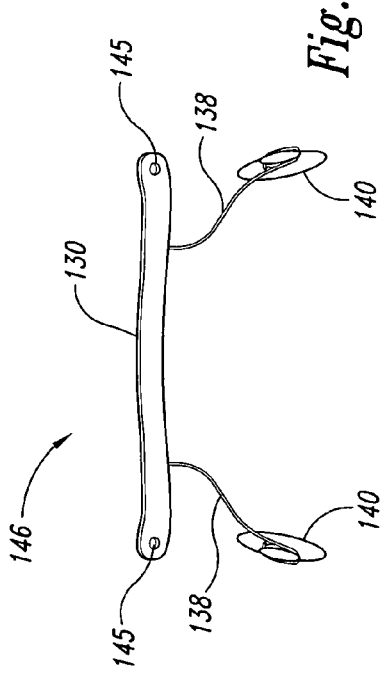
Fig. 6
Fig. 7

REINFORCED NOSE BRIDGE AND EYEGLASSES UTILIZING SAME

TECHNICAL FIELD

This invention relates to eyeglasses having a reinforced nose bridge. More particularly, this invention relates to eyeglasses with a reinforced nose bridge having a support structure that reinforces the nose bridge and provides nose pad supports.

BACKGROUND OF THE INVENTION

There are presently a wide variety of styles for eyeglasses available for a wearer to choose from. Some of the eyeglasses employ a frame that includes lens holders for supporting a pair of lenses joined together with a nose bridge. Other types of designs for eyeglasses use a rimless frame, and join the pair of lenses together with a nose bridge. Regardless of the particular type of frame, the nose bridge spans the space between the lenses, and, when the eyeglasses are positioned on the wearer's head, nose pads attached to the nose bridge or frame contact the sides of the wearer's nose to help support the eyeglasses in a desired position on the wearer's face.

One conventional design for a pair of eyeglasses is shown in FIG. 1. Eyeglasses 100 includes a pair of lenses 102 that are interconnected with a nose bridge 104. The nose bridge 104 has a pair of nose pad supports 105 that are molded inside of the nose bridge 104. Each of the nose pad supports 105 extends inside of the nose bridge 104 along only a small portion of its length, and projects downwardly so that respective nose pads 106 mounted to each of the nose pad supports 105 will bear against the sides of a wearer's nose when the eyeglasses 100 are worn by the wearer. The eyeglasses 100 further includes a pair of temples 108 that are pivotally attached to the lateral sides of each of the lenses 102 using respective hinges 110. The temples 108 extend rearwardly away from each of the lenses 102 and are configured to fit along the sides of a wearer's head so that the eyeglasses 100 are retained on the wearer's head.

One problem associated with the eyeglasses 100 is that the nose bridge 104 may not be sufficiently sturdy, or, if it is sufficiently sturdy, the nose bridge 104 must be undesirably thick to impart the requisite strength. Another problem associated with the eyeglasses 100 is the strength of the attachment between the nose pad supports 105 and the nose bridge 104 may not be sufficient to prevent the nose pad supports 105 from separating from the nose bridge 104. This problem may be exacerbated by making the nose bridge 104 relatively thin, which is often desired for styling reasons.

FIG. 2 shows another conventional design for a pair of eyeglasses. Eyeglasses 110 includes a pair of lenses 112 that are mounted to a frame 113. The frame 113 includes lens backing portions 114 that extend along the length of the upper portion of each of the lenses 112. The frame 113 further includes a nose bridge 116 that is integrally formed with each of the lens backing portions 114. The nose bridge 116 includes a pair of nose pads 118 that are mounted on a portion of the nose bridge 116. A pair of temples 120 are hingedly attached to the frame 113, and extend rearwardly away from each of the lenses 112.

One problem with the eyeglasses 110 is that the nose pads 118 are not adjustable to accommodate a variety of nose sizes. Therefore, the eyeglasses 110 use a nose bridge 116 that is designed to fit a specific nose size or a range of nose sizes, and will not properly fit certain nose sizes. Furthermore, the frame 113 including the nose bridge portion 116 may need to be undesirably bulky in order to provide sufficient structural support.

Therefore, there is a need in the art to provide a nose bridge for a pair of eyeglasses that is not undesirably bulky, while still providing a sufficient amount of strength. Furthermore, it would be desirable that the pair of eyeglasses include adjustable nose pads so that the eyeglasses can be adjusted to fit a range of nose sizes.

SUMMARY OF THE INVENTION

The invention is directed to a reinforced nose bridge structure, eyeglasses employing the reinforced nose bridge structure, and methods of making reinforced nose bridge structures and eyeglasses. In one aspect of the invention, a reinforced nose bridge structure includes an elongated body extending generally in a longitudinal direction and a support structure. The support structure includes a reinforcement portion extending generally in the longitudinal direction and at least part of the reinforcement portion being positioned within the elongated body. The support structure further includes a pair of nose pad support portions attached to the reinforcement portion and spaced apart from each other along the length of the reinforcement portion. The pair of nose pad support portions project away from the reinforcement portion and the elongated body. Eyeglasses employing the reinforced nose bridge structures include eyeglasses that use rimless frames or eyeglasses that have a frame such as, for example, a lens backing portion that may be integrally formed with the reinforced nose bridge structure.

BRIEF DESCRIPTION OF THE DRAWINGS

FIG. 6 is an isometric view of the frame of the eyeglass shown in FIGS. 3 through 5

FIG. 7 is an isometric view of the support structure of the reinforced nose bridge structure shown in FIGS. 3 through 6 according to one embodiment of the invention.

DETAILED DESCRIPTION OF THE EMBODIMENTS

The invention is directed to a reinforced nose bridge structure, eyeglasses employing the reinforced nose bridge structure, and methods of making reinforced nose bridge structures and eyeglasses. Many specific details of certain embodiments of the invention are set forth in the following description and in FIGS. 3 through 8 in order to provide a thorough understanding of such embodiments. One skilled in the art, however, will understand that the invention may have additional embodiments, or that the invention may be practiced without several of the details described in the following description.

Figure 1:
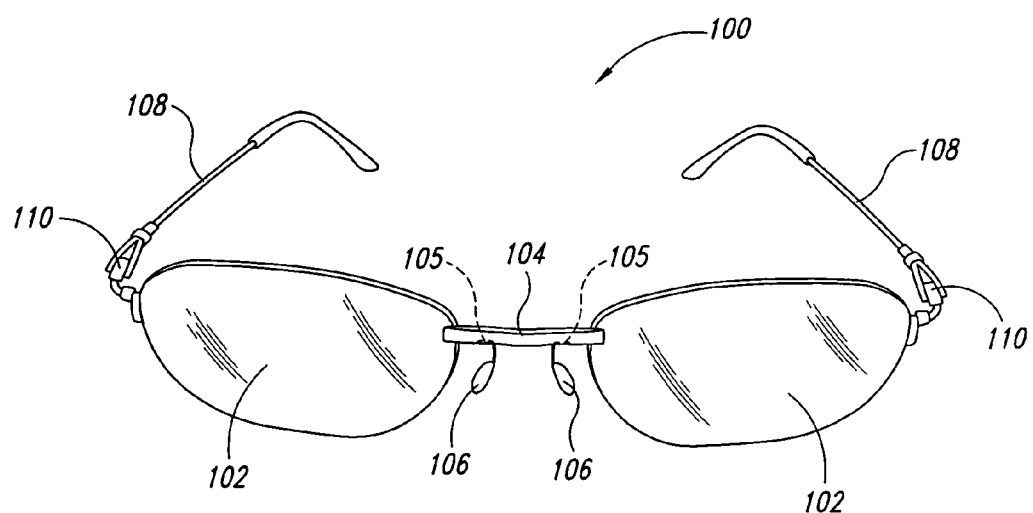
FIG. 1 is a front perspective view of a conventional pair of eyeglasses having a rimless frame with the pair of lenses being interconnected using a nose bridge.
Figure 2:
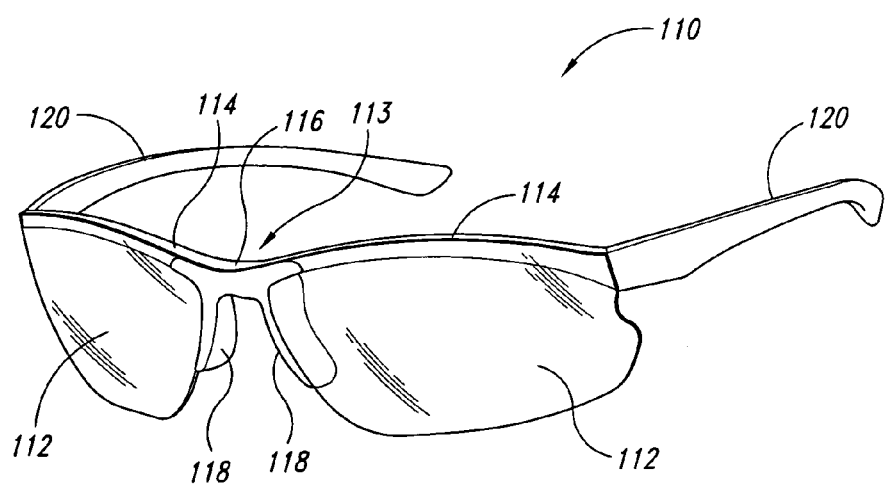
FIG. 2 is a front perspective view of another conventional pair of eyeglasses having a rimless frame with lens backing portions integrally formed with the nose bridge.
Figure 3:
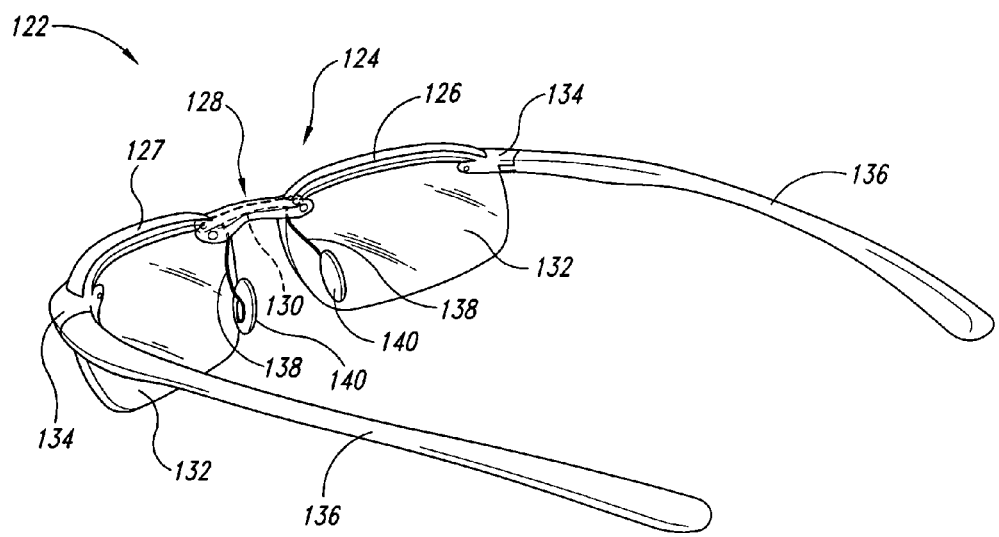
FIG. 3 is a rear perspective view of a pair of eyeglasses having a reinforced nose bridge structure according to one embodiment of the invention.
Figure 4:
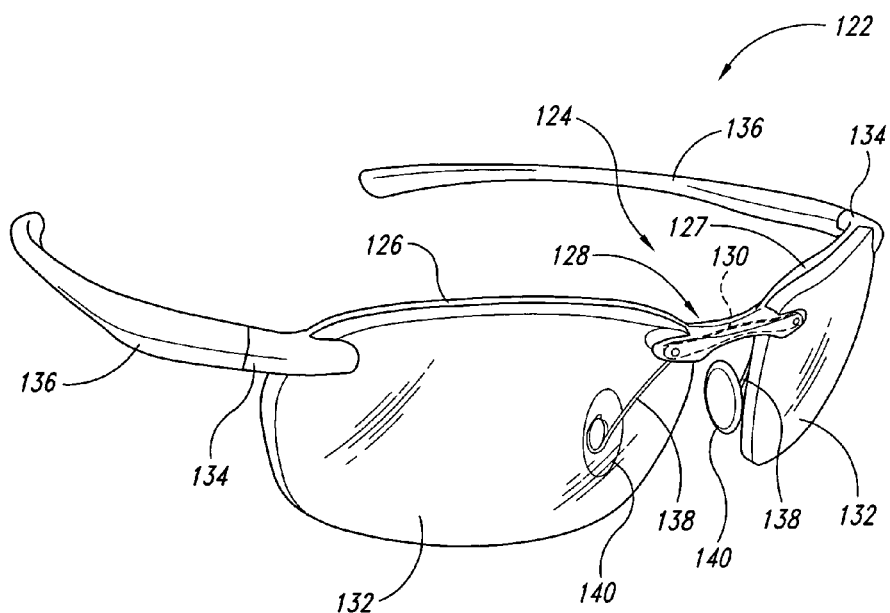
FIG. 4 is a front perspective view of the pair of eyeglasses shown in FIG. 3.
Figure 5:
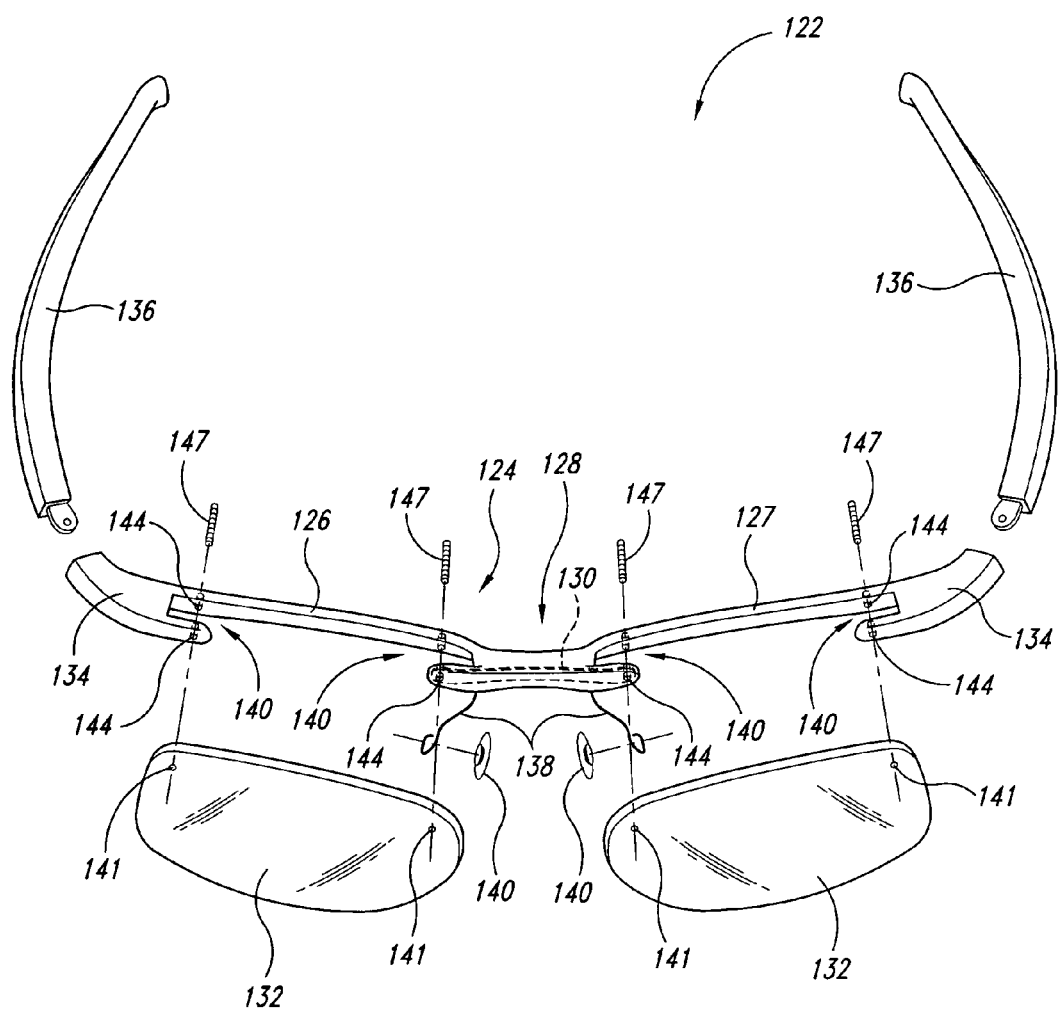
FIG. 5 is an exploded isometric view of the eyeglasses of FIGS. 3 and 4.

FIGS. 3 through 5 show schematic views of a pair of eyeglasses 122 according to an embodiment of the invention. The eyeglasses 122 include a frame 124 having a reinforced nose bridge 128 and a pair of lens backing portions 126 and 127, both of which extend from the reinforced nose bridge 128 to an attachment portion 134. In the embodiment shown in FIGS. 3 and 4, the lens backing portions 126, 127, the bridge 128, and the attachment portions 134 are formed integrally as a unitary structure. In alternative embodiments, the lens backing portions 126 and 127, and/or the attachment portions 134 may be separate components or the frame 124 may include sections that extend from the reinforced nose bridge 128 to surround the periphery of each of the lenses 132 to form rims. The reinforced nose bridge 128 includes a support structure having a reinforcement portion 130 and nose pad supports 138 extending therefrom that will be discussed in more detail in FIGS. 6 and 7.

As best shown in the exploded view of FIG. 5, lenses 132 (e.g., sunglass lenses or corrective lenses) are received by slots 140 of the frame 124, and the lenses 132 may be secured to the frame 124 using fastening elements 147 inserted through holes 144 in the frame 124 and corresponding holes 141 in each of the lenses 132 or another suitable technique. For example, instead of using fastening elements 147 to secure the lenses 132 to the frame 124, each of the lenses 132 may be suitably configured with tabs that are received by slots in the frame 122 to retain the lenses 132 on the frame 124. The eyeglasses 122 further include a pair of temples 136, configured to fit around the sides of a wearer's head, that are pivotally attached to the frame 124 at the attachment portions 134 in a conventional manner. However, other securing devices, such as straps extending between the attachment portions 134 behind the head of the wearer, may also be used. Nose pad supports 138 carrying nose pads 140 project downwardly from the reinforced nose bridge 128 to comfortably support the eyeglasses 122 on the nose of the wearer. The nose pad supports 138 are fabricated from a material, such as a metallic wire, that may be easily bent or cut into a desired length so that the manufacturer or wearer may alter the length thereof.

The structure of the reinforced nose bridge 128 and its associated support structure 146, which reinforces the reinforced nose bridge 128 and provides the nose pad supports 138, will be better understood with reference to FIGS. 6 and 7. A portion of the support structure 146 is embedded within a body 129 formed of a mass of cured polymeric material. The reinforcement portion 130 of the support structure 146 extends generally along the length of the reinforced nose bridge 128 to provide structural reinforcement thereof. Accordingly, the reinforced nose bridge 128 may be formed of less material and, thus, thinner and lighter than a conventional nose bridge because the reinforcement portion 130 stiffens the reinforced nose bridge 128. In the embodiment shown in FIG. 6, the reinforcement portion 130 is completely enclosed by the body 129. However, in some alternative embodiments, the reinforcement portion 130 may be partially enclosed by the body 129. The nose pad supports 138 are connected to the reinforcement portion 130 by being integrally formed therewith, soldering, gluing, or another suitable technique. The nose pad supports 138 project downwardly through the body 129 that is formed around the reinforcement portion 130. In the embodiment shown in FIG. 6, a small portion of each of the nose pad supports 138 is covered by the body 129, and the nose pad supports 138 project through the body 129. The ends of the nose pad supports 138 are curled to define openings suitably configured to receive the nose pads 140. The nose pad supports 138 are fabricated from a material, such as a metallic wire, that may be cut or curled to adjust the length thereof so that the eyeglasses 122 may be adjusted to fit a variety of different nose sizes.

With reference to FIG. 7, the support structure 146 has holes 145 at respective ends that extend through its thickness, and these holes 145 are aligned with corresponding holes 144 of the frame 124 so that fastening elements 147 may be inserted through corresponding holes 145 and a corresponding one of the holes 144 of the frame 124 and the holes 141 of the lenses 132 to secure each of the lenses 132 to the frame 124. However, a variety of other means may be used to secure the lenses 132 to the frame 124, such as by using a suitable adhesive, by thermal welding, or by other means. Therefore, the holes 145 in the support structure 128 may not be necessary in some embodiments. In alternative embodiments, the frame 124 may include holes that extend through portions other than the reinforced nose bridge 128 or holes that extend through the reinforced nose bridge 128, but not through any part of the support structure 146. Other configurations will also be apparent.

The frame 124 may be fabricated by insert molding or another suitable fabrication technique. In one embodiment, during insert molding, the holes 145 of the support structure 146 receive alignment pins to hold and position the support structure 146 in the mold in a desired position. A volume of polymeric material, such as a nylon or a polycarbonate polymeric material, is injected into the mold and cures around the reinforcement portion 130 and portions of the nose pad supports 138 to form the body 129 having a shape defined by the mold configuration. In an alternative embodiment, the support structure 146 is held in a desired position in the mold by an external fixture. For example, a fixture may hold onto the support structure 146 at one or both of the nose pad supports 138 to hold the support structure 146 in the desired position in the mold. In this embodiment, the holes 145 may be omitted from the reinforcement portion 130, if desired.

Figure 8:
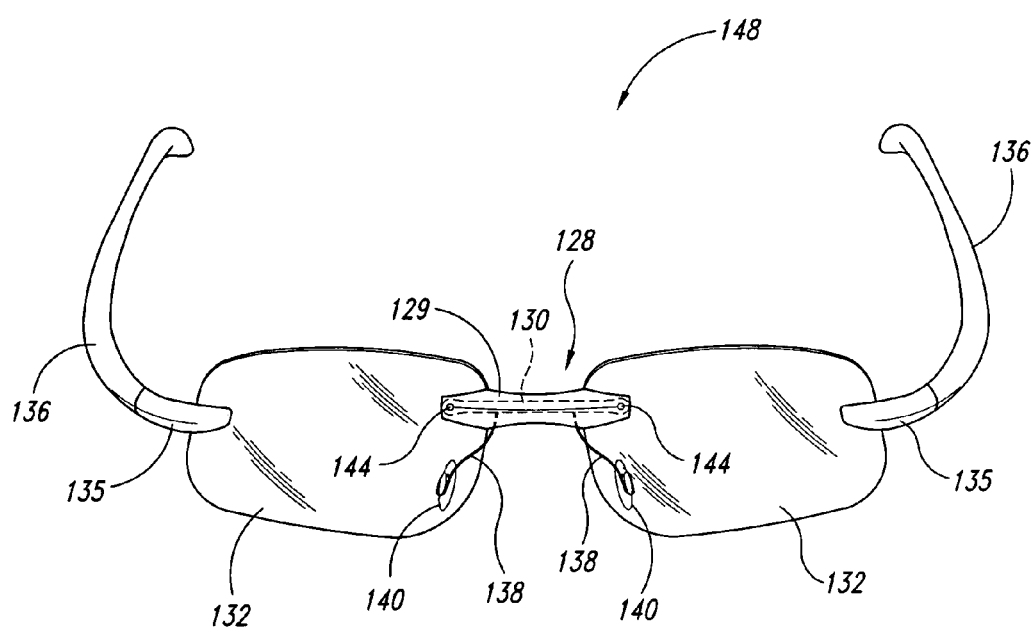
FIG. 8 is an isometric view of a rimless pair of eyeglasses having a reinforced nose bridge structure according to an alternative embodiment of the invention.

FIG. 8 shows an alternative embodiment for a rimless pair of eyeglasses 148. The eyeglasses 148 have many of the same components that are included in the eyeglasses 122 of FIG. 3. Therefore, in the interest of brevity, the components of the eyeglasses 122, 148 that correspond to each other have been provided with the same reference numerals, and an explanation of their structure and function will not be repeated. The eyeglasses 148 are identical to the eyeglasses 122 except that the lens backing portions 126 and 127 have been omitted and attachment portions 135 are separate components that are attached to respective lenses 132 in a conventional manner.

Accordingly, the reinforced nose bridge 128 may be formed into a variety of nose bridge configurations that are thinner and, hence, utilize less material than ordinarily would be used if the support structure 146 is not present. Also, by attaching the nose pad supports 138 to the reinforcement portion 130, which extends continuously through the nose bridge 128 for a substantial distance, the nose pad supports 138 are more securely attached to the nose bridge 128. Additionally, the nose pad supports 138 of the support structure 146 enable the reinforced nose bridge 128 to be used on a variety of different nose sizes by bending or cutting the nose pad supports 138 to adjust their respective lengths.

Although the invention has been described with reference to the disclosed embodiments, persons skilled in the art will recognize that changes may be made in form and detail without departing from the spirit and scope of the invention. For example, the reinforced nose bridges with their associated adjustable nose pad supports may be used on any type of eyewear that uses a nose bridge. Such modifications are well within the skill of those ordinarily skilled in the art. Accordingly, the invention is not limited except as by the appended claims.

What is claimed is:

1. A reinforced nose bridge structure, comprising:
   an elongated body extending generally in a longitudinal direction; and
   a support structure having the elongated body molded around portions thereof, the support structure comprising:
      a reinforcement portion extending generally in the longitudinal direction, at least part of the reinforcement portion positioned within the elongated body; and
      a pair of nose pad support portions spaced apart from each other along the length of the reinforcement portion, the pair of nose pad support portions being attached to the reinforcement portion and projecting away from the reinforcement portion and the elongated body.

2. The reinforced nose bridge structure of claim 1 wherein the reinforcement portion is enclosed by the elongated body and portions of each of the pair of nose pad support portions project through the elongated body.

3. The reinforced nose bridge structure of claim 1 wherein the reinforcement portion and the pair of nose pad support portions are integrally formed as a unitary structure.

4. The reinforced nose bridge structure of claim 3 wherein the nose pad support portions and the reinforcement portion comprises a unitary bent wire.

5. The reinforced nose bridge structure of claim 1 wherein the reinforcement portion comprises a pair of mounting holes, each of the mounting holes located at an end region of the reinforcement portion and extends transversely through the reinforcement portion, each of the pair of mounting holes being aligned with corresponding mounting holes in the elongated body.

6. The reinforced nose bridge structure of claim 1, further comprising a pair of lens backing portions integrally formed with the elongated body, each of the lens backing portions extending away from the elongated body in opposing directions to an attachment portion.

7. The reinforced nose bridge structure of claim 1 wherein each of the pair of nose pad support portions are formed from a material that can be bent to alter the configuration thereof.

8. Eyeglasses, comprising:
   a pair of lenses; and
   a frame supporting the pair of lenses, the frame including a reinforced nose bridge structure, the reinforced nose bridge structure comprising:
      an elongated body extending generally in a longitudinal direction; and
      a support structure comprising:
         a reinforcement portion extending generally in the longitudinal direction, at least part of the reinforcement portion positioned within the elongated body; and
         a pair of nose pad support portions spaced apart from each other along the length of the reinforcement portion, the pair of nose pad support portions being attached to the reinforcement portion and projecting away from the reinforcement portion and the elongated body, wherein the reinforcement portion comprises a pair of mounting holes, each of the mounting holes located at an end region of the reinforcement portion and extend generally transversely through the reinforcement portion, each of the pair of mounting holes being aligned with corresponding mounting holes in the elongated body and each of the lenses; and
      a fastener inserted through each of the pair of mounting holes of the reinforcement portion, the corresponding mounting holes in the elongated body, and the corresponding mounting holes of each of the lenses to secure the pair of lenses to the frame.

9. The eyeglasses of claim 8 wherein the elongated body is molded around portions of the support structure.

10. The eyeglasses of claim 8 wherein the reinforcement portion is enclosed by the elongated body and portions of each of the pair of nose pad support portions project through the elongated body.

11. The eyeglasses of claim 8 wherein the reinforcement portion and the pair of nose pad support portions are integrally formed as a unitary structure.

12. The eyeglasses of claim 11 wherein the nose pad support portions and the reinforcement portion comprise a unitary bent wire.

13. The eyeglasses of claim 8 wherein the frame comprises a pair of lens backing portions extending away from the elongated body in opposing directions to an attachment portion.

14. The eyeglasses of claim 13, further comprising a pair of temples attached to respective attachment portions of the frame.

15. The eyeglasses of claim 13 wherein the pair of lens backing portions are integrally formed with the elongated body of the reinforced nose bridge structure.

16. The eyeglasses of claim 8 wherein the reinforced nose bridge structure is connected directly to the pair of lenses.

17. The eyeglasses of claim 8 wherein the frame comprises a pair of frame sections extending from the reinforced bridge structure, each of the frame sections extending about one of the lenses.

18. The eyeglasses of claim 8 wherein each of the pair of nose pad support portions are formed from a material that can be bent to alter the configuration thereof.

19. A method of forming a reinforced nose bridge, the method comprising:
   inserting a support structure into a mold, the support structure comprising a reinforcement portion and a pair of nose pad support portions attached to the reinforcement portion at spaced apart locations along the length of the reinforcement portion, the nose pad support portions extending outwardly from the reinforcement portion; and
   forming a body around a portion of the support structure by injection molding so that the reinforcement portion extends generally in a longitudinal direction of the body and the pair of nose pad support portions project outwardly from the body.

20. The method of claim 19, further comprising:
   forming a pair of holes in the reinforcement portion at opposite ends thereof; and
   inserting alignment pins to hold the support structure in the mold in a desired position.

21. The method of claim 19, further comprising holding at least one of the pair of nose pad support portions to hold the support structure in the mold in a desired position.

22. The method of claim 19 wherein the body comprises a polymeric material.

23. Eyeglasses, comprising:
a pair of lenses; and
a frame supporting the pair of lenses, the frame including a reinforced nose bridge structure, the reinforced nose bridge structure comprising:
an elongated body extending generally in a longitudinal direction; and
a support structure having the elongated body molded around portions thereof, the support structure comprising:
a reinforcement portion extending generally in the longitudinal direction, at least part of the reinforcement portion positioned within the elongated body; and
a pair of nose pad support portions spaced apart from each other along the length of the reinforcement portion, the pair of nose pad support portions being attached to the reinforcement portion and projecting away from the reinforcement portion and the elongated body.

24. The eyeglasses of claim 23 wherein the reinforcement portion is enclosed by the elongated body and portions of each of the pair of nose pad support portions project through the elongated body.

25. The eyeglasses of claim 23 wherein the reinforcement portion and the pair of nose pad support portions are integrally formed as a unitary structure.

26. The eyeglasses of claim 25 wherein the nose pad support portions and the reinforcement portion comprise a unitary bent wire.

27. The eyeglasses of claim 23:
wherein the reinforcement portion comprises a pair of mounting holes, each of the mounting holes located at an end region of the reinforcement portion and extend generally transversely through the reinforcement portion, each of the pair of mounting holes being aligned with corresponding mounting holes in the elongated body and each of the lenses; and
further comprising a fastener inserted through each of the pair of mounting holes and the corresponding mounting holes in the elongated body and each of the lenses to secure the pair of lenses to the frame.

28. The eyeglasses of claim 23 wherein the frame comprises a pair of lens backing portions extending away from the elongated body in opposing directions to an attachment portion.

29. The eyeglasses of claim 28, further comprising a pair of temples attached to respective attachment portions of the frame.

30. The eyeglasses of claim 28 wherein the pair of lens backing portions are integrally formed with the elongated body of the reinforced nose bridge structure.

31. The eyeglasses of claim 23 wherein the reinforced nose bridge structure is connected directly to the pair of lenses.

32. The eyeglasses of claim 23 wherein the frame comprises a pair of frame sections extending from the reinforced bridge structure, each of the frame sections extending about one of the lenses.

* * * * *